United States Patent
Szita et al.

(10) Patent No.: US 9,953,672 B1
(45) Date of Patent: Apr. 24, 2018

(54) ACCURATE REPEATABLE RUNOUT COMPENSATION IN DISK DRIVES DURING SEEKS

(71) Applicant: KABUSHIKI KAISHA TOSHIBA, Tokyo (JP)

(72) Inventors: Gabor Szita, Mountain View, CA (US); Jiangang Liang, Saratoga, CA (US)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/331,380

(22) Filed: Oct. 21, 2016

(51) Int. Cl.
  *G11B 5/596* (2006.01)
  *G11B 20/18* (2006.01)
(52) U.S. Cl.
  CPC ...... *G11B 5/59661* (2013.01); *G11B 5/59627* (2013.01); *G11B 5/59644* (2013.01); *G11B 5/59666* (2013.01); *G11B 20/18* (2013.01)
(58) Field of Classification Search
  None
  See application file for complete search history.

(56) References Cited

U.S. PATENT DOCUMENTS

| 7,450,336 B1 | 11/2008 | Wang et al. | |
| 8,537,486 B2 * | 9/2013 | Liang | G11B 5/59627 360/55 |
| 8,670,206 B1 | 3/2014 | Liang et al. | |
| 9,460,743 B1 * | 10/2016 | Sudo | G11B 5/59627 |

* cited by examiner

*Primary Examiner* — K. Wong
(74) *Attorney, Agent, or Firm* — Patterson & Sheridan, LLP (57) ABSTRACT

A repeatable runout (RRO) is accurately compensated for while moving a magnetic head radially across a disk surface. An iterative learning control algorithm is employed to determine appropriate feed-forward coefficients for an RRO compensation signal for each of a plurality of radial locations across the disk surface. The feed-forward coefficients are determined by performing multiple iterations of continuously moving the magnetic head across the disk surface along a target path while measuring a position error signal that indicates the radial error between the magnetic head and the target path. With each iteration, the iterative learning control algorithm computes new feed-forward coefficients for each of the plurality of radial locations, where the new feed-forward coefficients are selected to reduce the measured position error signal when employed to move the magnetic head along the target path.

20 Claims, 8 Drawing Sheets

ACCURATE REPEATABLE RUNOUT COMPENSATION IN DISK DRIVES DURING SEEKS

BACKGROUND

Disk drives typically have disk synchronous repeatable runout (RRO), which is the offset between the ideal track location for a particular track and an actual track location, which is defined by servo burst information for the track formed on the disk. To accurately position a read or write head in the presence of such runout typically requires special RRO compensation algorithms. These algorithms inject a suitable control signal into a head actuator, so that the read or write head follows the desired RRO path with good accuracy. Because RRO is primarily induced by cyclically repeating phenomenon, such as disk eccentricity, clamping distortions, harmonic vibrations within the drive, and the like, the largest components of RRO error are harmonic in nature. Consequently, RRO compensation algorithms are designed to address the largest components of RRO by compensating for RRO that corresponds to various harmonics of disk rotational frequency.

Typically, RRO compensation algorithms minimize or eliminate RRO at a desired harmonic by determining the amplitude and phase of an appropriate sinusoidal compensation signal that is then injected into the head actuator. Alternatively, the sine and cosine components of the sinusoidal compensating signals may be used instead of amplitude and phase. In either case, such RRO compensation algorithms are typically adaptive, in that they continuously adjust the gain/phase or sin/cos compensation coefficients while the disk drive actuator servo system positions the read head on a certain disk drive track. However, the adaptation is typically slow, taking as many as several hundred disk revolutions to converge, and therefore is unable to converge to correct coefficient values when the read head is moved radially across the disk surface. As a result, the servo system cannot accurately compensate for RRO variation as the read head is moved across the surface of the disk radially, such as during seeks.

During some operations, it is desirable to minimize the magnitude of RRO while the head actuator is moving radially, i.e., moving across the stroke rather than servoing over a particular track. One such example is when a disk drive writes reference spirals on a disk as part of a spiral-based self-servo writing process. For an error-free and robust self-servo writing process, the reference spirals used should be precisely written on the disk surface, so that the drive can write servo wedges onto a surface of the disk with the necessary precision for proper operation of the drive. However, because existing RRO compensation algorithms may not provide sufficient head positioning accuracy while moving the head actuator radially to write reference spirals, such reference spirals can include an unacceptable level of error, thereby affecting operation of the drive. Accordingly, there is a need in the art for a method of accurately compensating for RRO when actuating a read or write head radially across a disk surface.

SUMMARY

One or more embodiments described herein provide systems and methods for accurately compensating for repeatable runout (RRO) while moving a magnetic head radially across a disk surface. An iterative learning control algorithm is employed to determine appropriate feed-forward coefficients for an RRO compensation signal for each of a plurality of radial locations across the disk surface. The feed-forward coefficients are determined by performing multiple iterations of continuously moving the magnetic head across the disk surface along a target path while measuring a position error signal that indicates the radial error between the magnetic head and the target path. With each iteration, the iterative learning control algorithm computes new feed-forward coefficients for each of the plurality of radial locations, where the new feed-forward coefficients are selected to reduce the measured position error signal when employed to move the magnetic head along the target path.

A method of controlling a read head in a magnetic storage device, according to an embodiment, includes the steps of rotating the disk having a surface with servo wedges, moving the read head continuously across the disk from a first radial location to a second radial location while positioning the read head based on the servo wedges and a feed-forward correction signal and generating a position error signal (PES), and measuring the generated PES at multiple radial locations of the disk as the read head is moved continuously in a radial direction, wherein each measured PES is input to an adaptive learning algorithm that corrects feed-forward coefficients for the feed-forward correction signal.

A data storage device, according to another embodiment, comprises a first data storage disk having a first recording surface with servo wedges, a second data storage disk having a second recording surface, first and second read/write heads, and a controller. The first and second read/write heads are configured to move in unison in a radial direction relative to the first and second recording surfaces, respectively. The controller is configured to rotate the first and second data storage disks, move the read head continuously across the first data storage disk from a first radial location to a second radial location while positioning the read head based on the servo wedges and a feed-forward correction signal and generating a position error signal (PES), and measure the generated PES at multiple radial locations of the first data storage disk as the read head is moved continuously in the radial direction, wherein each measured PES is input to an adaptive learning algorithm that corrects feed-forward coefficients for the feed-forward correction signal.

BRIEF DESCRIPTION OF THE DRAWINGS

So that the manner in which the above recited features of embodiments of the invention can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
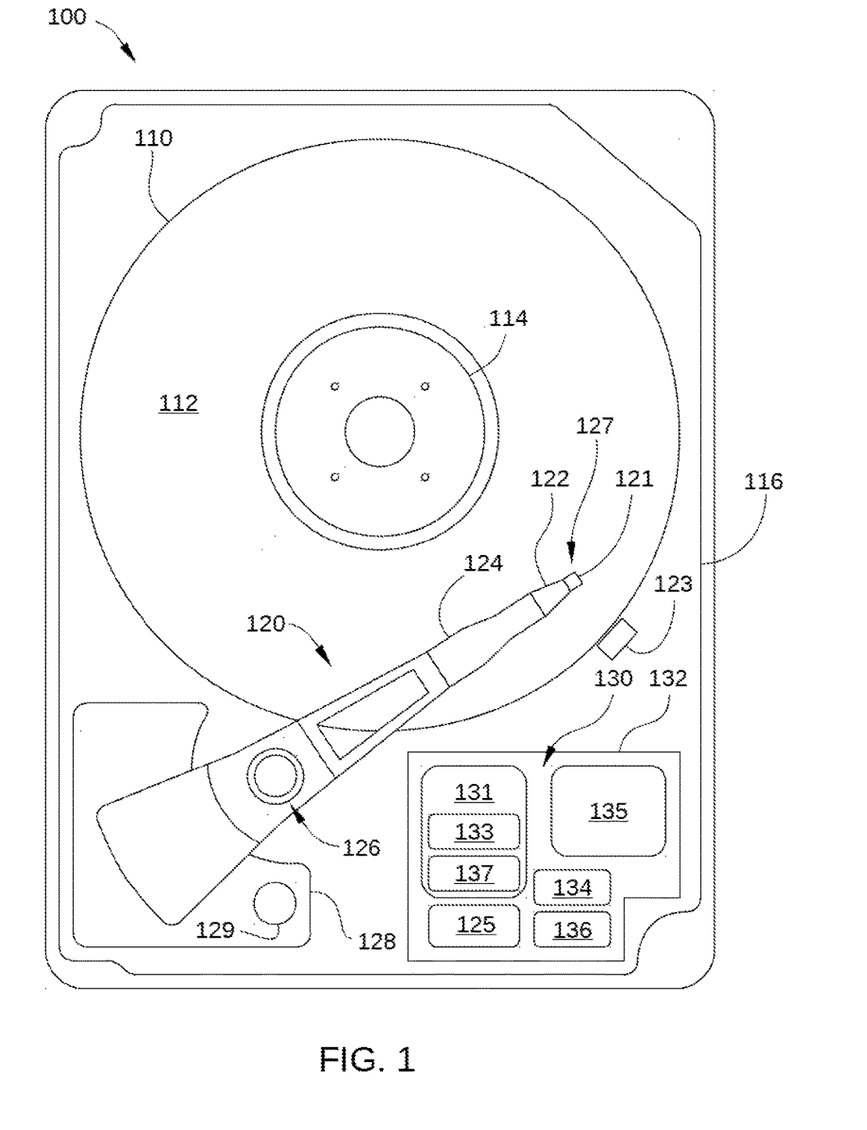
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 includes multiple storage disks 110 (only one of which is visible in FIG. 1) that each include one or two recording surfaces 112 on which a plurality of concentric data storage tracks are disposed. Storage disks 110 are coupled to and rotated by a spindle motor 114 that is mounted on a base plate 116. An actuator arm assembly 120 is also mounted on base plate 116, and includes multiple sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, random-access memory (RAM) 134 (which may be a dynamic RAM and is used as a data buffer) and/or a flash memory device 135 and a flash manager device 136. In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

HDD 100 also includes an inner diameter (ID) crash stop 129 and a load/unload ramp 123. ID crash stop 129 is configured to restrict motion of actuator arm assembly 120 to preclude damage to read/write head 127 and/or storage disk 110. Load/unload ramp 123 is typically disposed proximate the outer diameter (OD) of storage disk 110 and is configured to unload read/write head 127 from storage disk 110.

Figure 2:
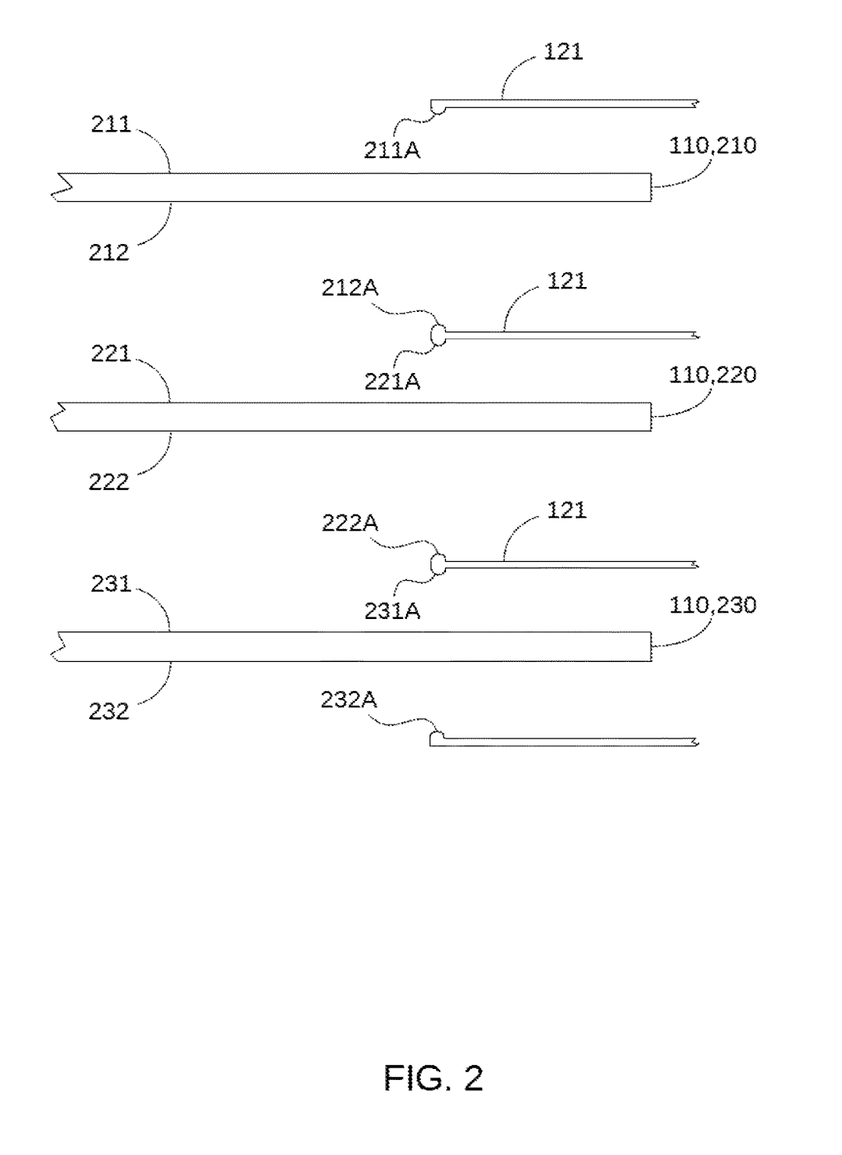
FIG. 2 schematically illustrates a partial side-view of the multiple storage disks and sliders of the hard disk drive of FIG. 1, according to an embodiment.

FIG. 2 schematically illustrates a partial side-view of the multiple storage disks 110 and sliders 121 of HDD 100, according to an embodiment. As shown, HDD is configured with multiple storage disks 110 and multiple read/write heads 127. Specifically, in the embodiment illustrated in FIG. 2, HDD 100 includes a storage disk 210 with recording surfaces 211 and 212, a storage disk 220 with recording surfaces 221 and 222, and a storage disk 230 with recording surfaces 231 and 232. HDD 100 further includes read/write heads 211A, 212A, 221A, 222A, 231A, 232A that are each associated with a particular recording surface of one of storage disks 210, 220, and 230, i.e., recording surfaces 211, 212, 221, 222, 231, and 232, respectively.

When data are transferred to or from a particular storage disk 110 of HDD 100, actuator arm assembly 120 moves in an arc between the ID and the OD of the storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system positions read/write head 211A over recording surface 211 based on positioning data read from recording surface 211, and positions read/write head 212A over recording surface 212 based on positioning data read from recording surface 212.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, i.e., a position error signal (PES). The PES is typically generated by using servo patterns included in the servo wedges on the recording surface 112 as a reference. One embodiment of a recording surface 112 is illustrated in FIG. 3.

Figure 3:
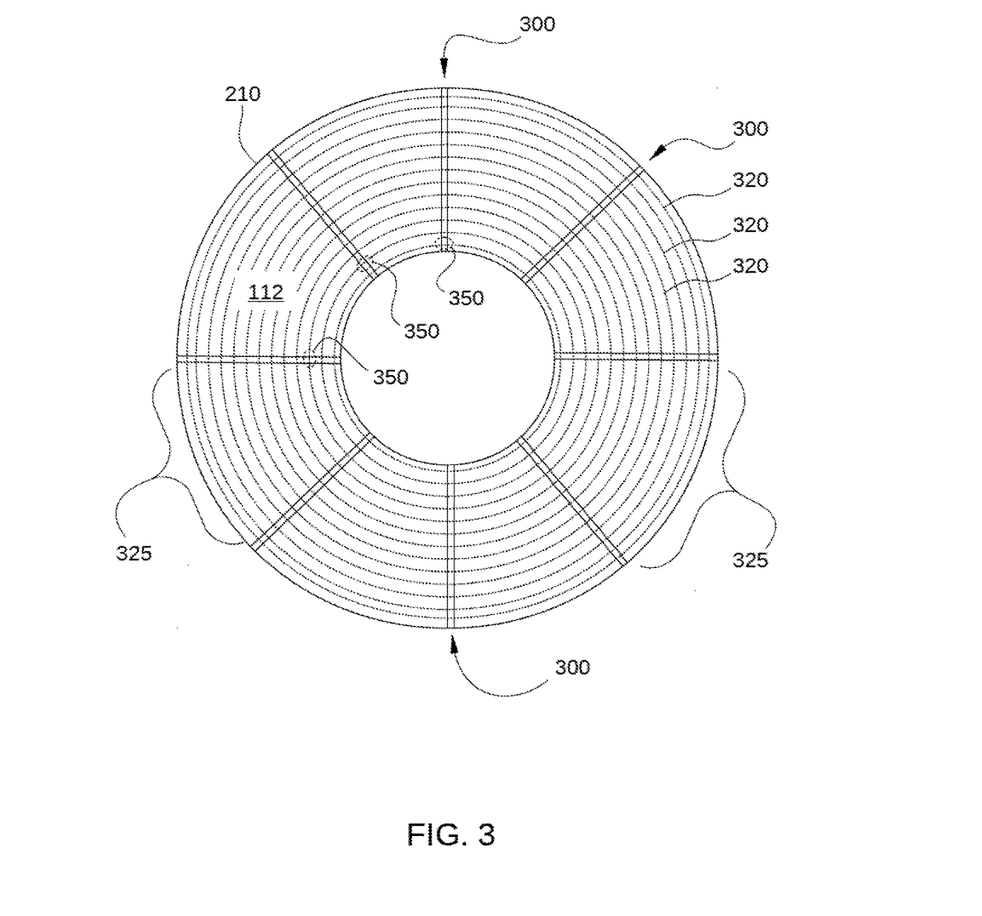
FIG. 3 illustrates a recording surface of a storage disk with servo wedges and concentric data storage tracks formed thereon, according to an embodiment.

FIG. 3 illustrates a recording surface 112 of a storage disk 110 with servo wedges 300 and concentric data storage tracks 320 formed thereon, according to an embodiment. Servo wedges 300 may be written on recording surface 112 by either a media writer or by HDD 100 itself via a self-servo-write (SSW) process. Servo wedges 300 may be substantially radially aligned. In practice, servo wedges 300 may be somewhat curved. For example, servo wedges 300 may be configured in a spiral pattern that mirrors the path that would be followed by read/write head 127 if read/write head 127 were to be moved across the stroke of actuator arm assembly 120 while storage disk 110 is not spinning. Such a curved pattern advantageously results in the wedge-to-wedge timing being independent of the radial position of read/write head 127. For simplicity, servo wedges 300 are depicted as substantially straight lines in FIG. 3. Each servo wedge 300 includes a plurality of servo sectors 350 containing servo information that defines the radial position and track pitch, i.e., spacing, of data storage tracks 320.

Data storage tracks 320 for storing data are located in data sectors 325, and are positionally defined by the servo information written in servo sectors 350. Each servo sector 350 contains a reference signal that is read by read/write head 127 during read and write operations to position read/write head 127 above a desired data storage track 320. Typically, the actual number of data storage tracks 320 and servo wedges 300 included on recording surface 112 is considerably larger than illustrated in FIG. 3. For example, recording surface 112 may include hundreds of thousands of concentric data storage tracks 320 and hundreds of servo wedges 300.

In some embodiments, servo wedges 300 written on one recording surface 112 of HDD 100 enable writing of reference spirals on a different recording surface 112. For example, referring to FIG. 2, in one such embodiment, servo wedges 300 are written on recording surface 211 and are employed to write one or more reference spirals on another recording surface 112 of HDD 100, such as recording surface 221 or 231. Specifically, using the timing and position information read from the servo wedges 300 on recording surface 211, as well as an RRO compensation signal, the servo system of HDD 100 can precisely control the radial location of read/write head 211A, so that read/write head 211A follows a target path on recording surface 211, such as the path of an ideally formed reference spiral on recording surface 221. Simultaneously, another read/write head of HDD 100, such as read/write head 221A or read/write head 231A, can write on another recording surface a reference spiral having substantially the same shape as the target path on recording surface 211, as illustrated in FIG. 4.

Figure 4:
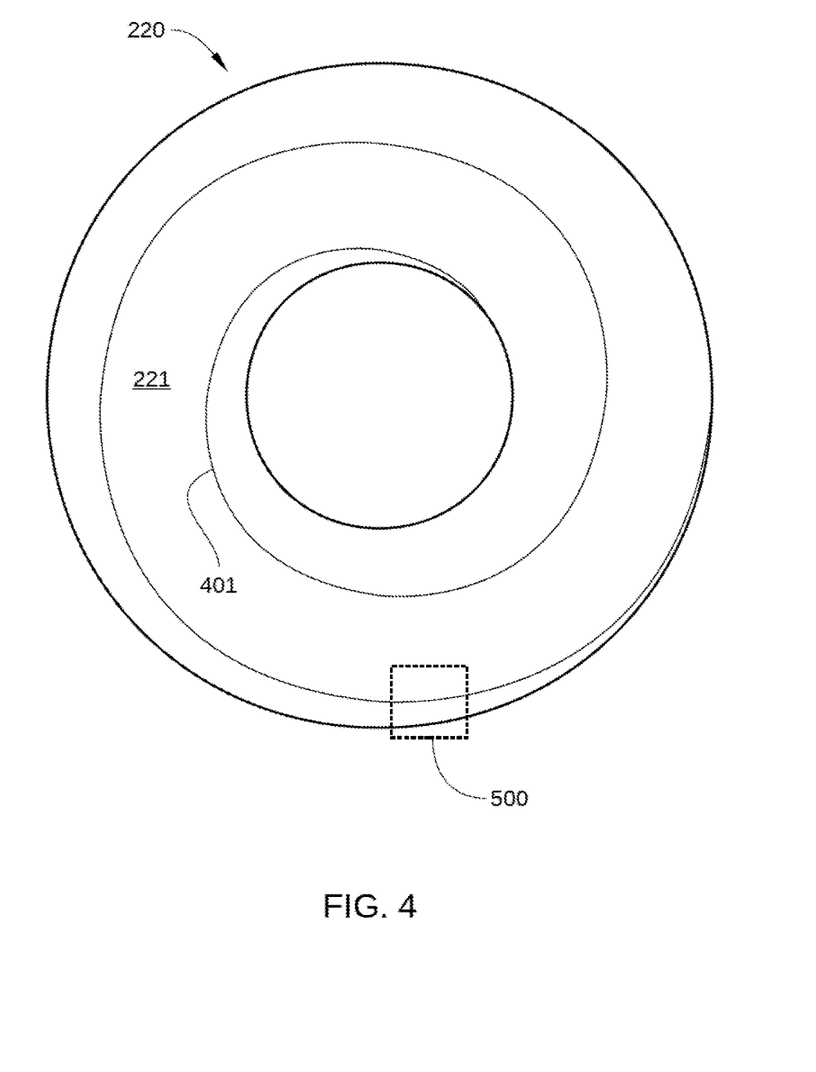
FIG. 4 illustrates a recording surface of the storage disk of FIG. 3 with a single reference spiral written thereon, according to one embodiment.

FIG. 4 illustrates recording surface 221 of storage disk 220 with a single reference spiral 401 written thereon, according to one embodiment. As noted above, reference spiral 401 can be formed on recording surface 221 by controlling the radial location of read/write head 211A (and therefore also the radial location of read/write head 221A). Specifically, the servo system of HDD 100 moves read/write head 211A and 221A radially across recording surfaces 211 and 221, respectively, based on timing and position information read from the servo wedges 300 on recording surface 211, and on an RRO compensation signal. The motion of read/write head 221A as reference spiral 401 is written on recording surface 220 is shown in FIG. 5.

Figure 5:
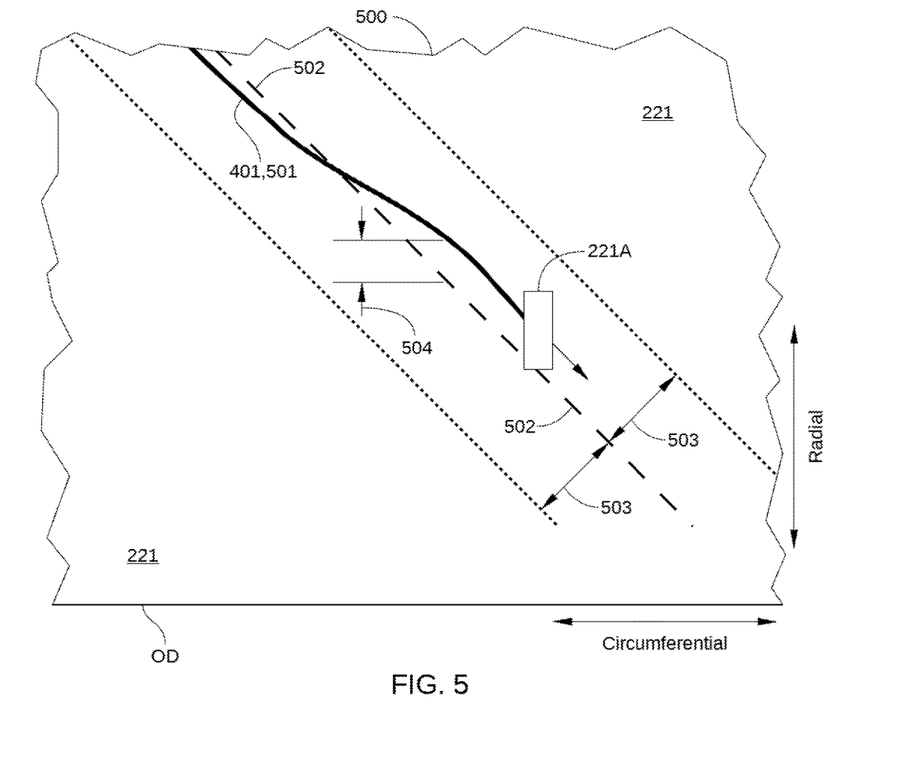
FIG. 5 is a schematic illustration of a portion of the recording surface indicated in FIG. 4 as a reference spiral is being written thereon, according to an embodiment.

FIG. 5 is a schematic illustration of a portion 500 of recording surface 221 indicated in FIG. 4 as reference spiral 401 is being written thereon, according to an embodiment. A horizontal displacement in FIG. 5 corresponds to a circumferential displacement of read/write head 221A with respect to recording surface 221, caused by rotation of storage disk 220. A vertical displacement in FIG. 5 corresponds to a radial displacement of read/write head 221A with respect to recording surface 221, caused by rotation of actuator arm assembly 120.

As shown, a portion 501 of reference spiral 401 extends diagonally across recording surface 221. Reference spiral 401, in conjunction with other reference spirals on recording surface 221, is configured to provide position and timing information that enable the internal servo system of HDD 100 to perform a SSW process, thereby writing servo wedges 300 on recording surface 221. Also shown are the position of read/write head 221A and a target path 502 that indicates an ideal location for reference spiral 401 for optimal operation of HDD 100. When the actual location of reference spiral 401 is within a maximum acceptable offset 503 of target path 502, the servo system of HDD 100 can write servo wedges 300 onto recording surface 221 with the necessary precision for proper operation of HDD 100. However, when reference spiral 401, as written, falls outside of maximum acceptable offset 503, servo wedges 300 may not be written accurately, and issues affecting operation of HDD, such as track squeeze, may result.

In the embodiment illustrated in FIG. 5, maximum acceptable offset 503 is depicted as an offset distance of reference spiral 401 from target path 502 that is measured perpendicular to target path 502. In other embodiments, maximum acceptable offset 503 is a radial offset distance 504 of reference spiral 401 from target path 502. In yet other embodiments, maximum acceptable offset 503 is a circumferential offset distance of reference spiral 401 from target path 502 (not shown).

Writing reference spiral 401 on recording surface 221 involves precisely controlling the radial position of read/write head 221A as read/write head 221A is moved continuously across the stroke of actuator arm assembly 120, for example from ID to OD of recording disk 220 or vice versa. That is, read/write head 221A moves continuously in the radial direction while a different read/write head of HDD 100 servos off the servo wedges 300 on a different recording surface of HDD 100, such as recording surface 211. However, conventional techniques have proven inadequate for providing sufficiently precise control when writing with read/write head 221A, as illustrated in FIG. 6.

Figure 6:
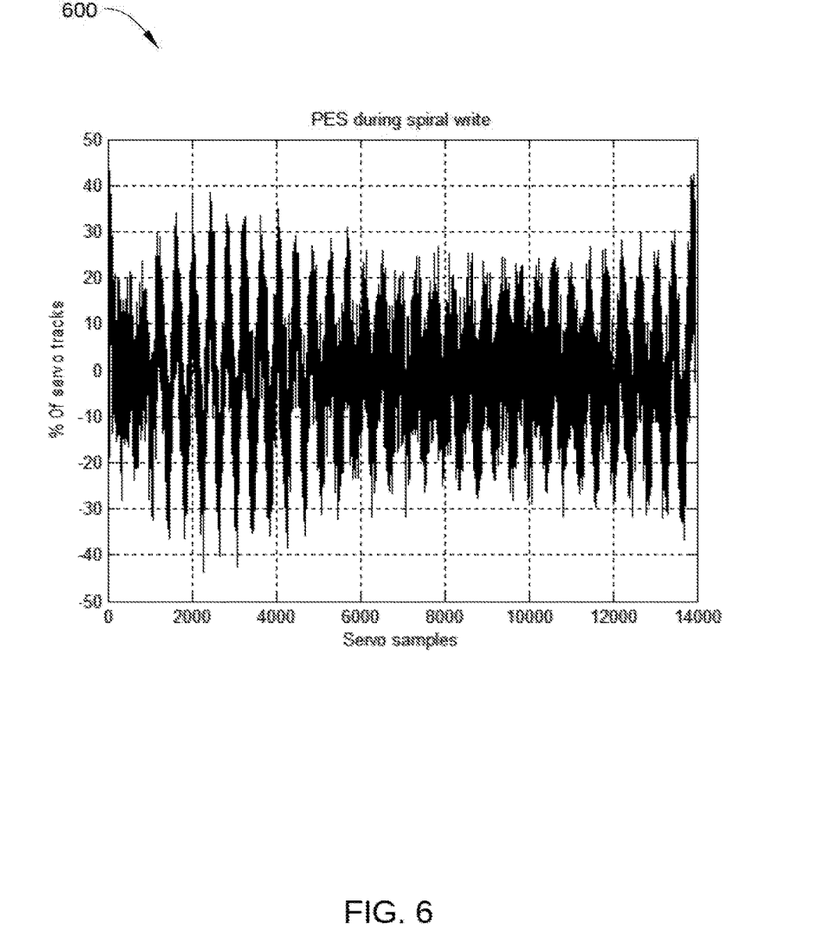
FIG. 6 is a graph showing PES during a seek by a read/write head while the servo system of the hard drive of FIG. 1 attempts to move read/write head along a target path for the reference spiral.

FIG. 6 is a graph 600 showing PES during a seek by read/write head 221A while the servo system of HDD 100 attempts to move read/write head 221A along target path 502 for reference spiral 401. The servo samples 600 (x-axis) are taken as read/write head 221A is moved across recording surface 221A from the ID of storage disk 220 to the OD of storage disk 220, where the PES is an offset distance between target path 502 and an actual path of read/write head 221A. For example, the PES shown in graph 600 may be a radial offset distance 504 between target path 502 and the actual path of read/write head 221A, as measured via servo wedges 300 on recording surface 211. As shown, the PES for read/write head 221A reaches values as high as 40% of servo track width, which is highly undesirable for reference spiral 401.

In positioning a read/write head 127 over a particular data storage track 320 of recording surface 112, a control signal for positioning read/write head 127 is based on a position feedback signal, i.e., the currently measured PES, and a feed-forward signal, i.e., a sinusoidal compensation signal generated by an RRO compensation algorithm. The sinusoidal compensation signal compensates for RRO as read/write head 127 servos on a particular data storage track 320. However, as shown in FIG. 6, as read/write head 127 is moved radially across recording surface 112 and crosses a plurality of data storage tracks 320, the servo system of HDD 100 does not accurately compensate for RRO variation when employing the above-described sinusoidal compensation signals for the data storage tracks being crossed. Thus, when read/write head 127 continuously seeks across recording surface 112, for example when writing reference spiral 401, PES can have an undesirable magnitude.

According to various embodiments, an iterative learning control (ILC) algorithm is employed to determine appropriate feed-forward coefficients for an RRO compensation signal for each of a plurality of radial locations across the disk surface. More specifically, the feed-forward coefficients are for an RRO compensation signal that compensates for RRO as read/write head 127 is moved continuously across recording surface 112 in a radial direction to follow a target path. By contrast, in conventional techniques, a repetitive control algorithm determines appropriate feed-forward coefficients for an RRO compensation signal for a single specific data storage track 320. That is, according to conventional techniques, feed-forward coefficients for an RRO compensation signal are determined for controlling the radial position of read/write head 127 as read/write head 127 servos on a single data storage track 320.

Figure 7:
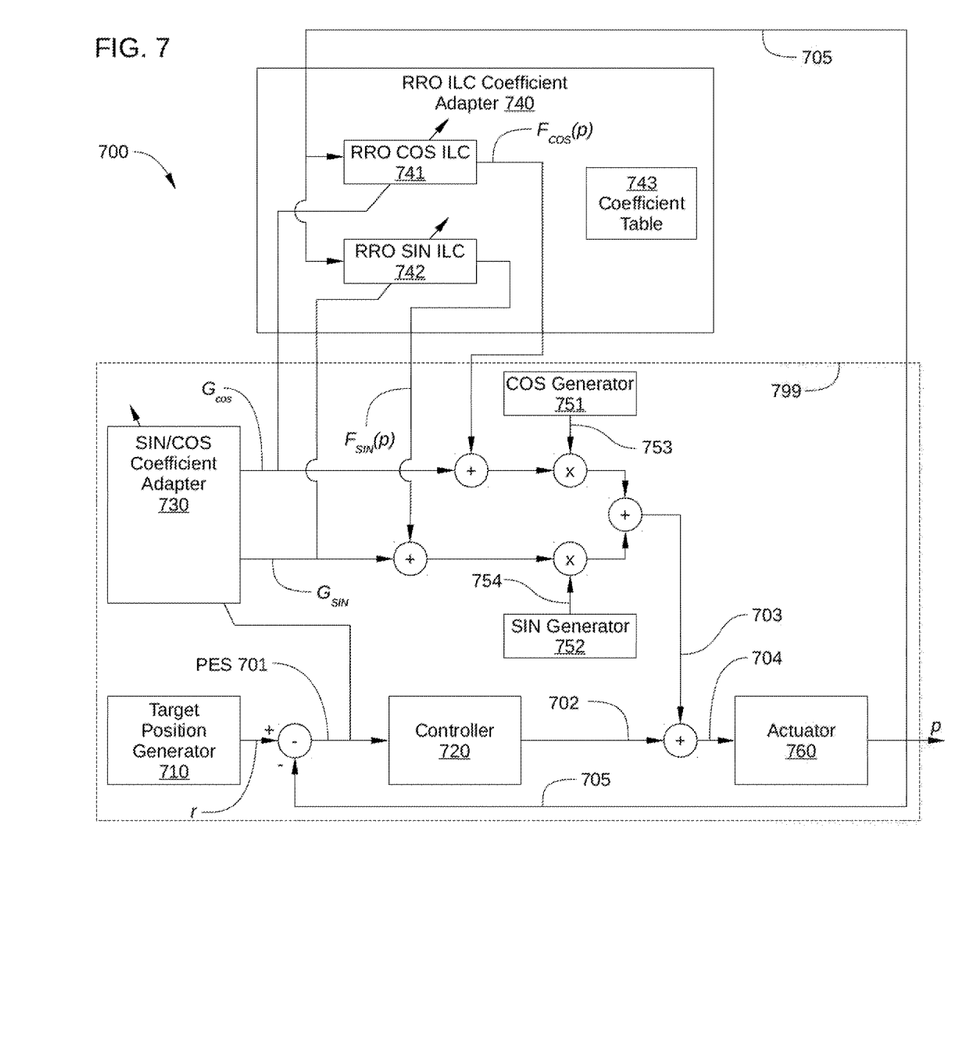
FIG. 7 is a simplified control system block diagram illustrating a control system, according to some embodiments.

FIG. 7 is a simplified control system block diagram illustrating a control system 700, according to some embodiments. Control system 700 includes a target position generator 710, a controller 720, SIN/COS coefficient adapter 730, an RRO ILC coefficient adapter 740, a COS generator 751, a SIN generator 752, and an actuator 760, as shown. Control system 700 further includes various summers, multipliers, and feedback and feed-forward signals that interact with the above elements of control system 700 as shown. Control system 700 as a whole, or each of the elements of control system 700 set forth above, may be implemented as any suitable processor or logic circuit, such as a central processing unit (CPU), an application-specific integrated circuit (ASIC), a field programmable gate array (FPGA), any other type of processing unit, or a combination of different processing units. Thus, control system 700, or each of the elements of control system 700 set forth above, may be any technically feasible hardware unit capable of processing input signals or other data and/or executing software applications to facilitate operation of HDD 100 as described herein.

Target position generator 710 provides the current target (radial) position r for a particular read/write head 127, and controller 720 receives an error signal, i.e., PES 701, and generates an actuator input signal 702 for controlling the position of read/write head 127. SIN/COS coefficient adapter 730 is configured to receive PES 701 and generate gain/phase or sin/cos compensation coefficients for an RRO compensation signal 703 that modifies actuator input signal 702. Specifically, SIN/COS coefficient adapter 730 is configured to implement a repetitive control algorithm that continuously adjusts the gain/phase or sin/cos coefficients for RRO compensation signal 703 while the servo system for HDD 100 follows a particular data storage track 320.

COS generator 751 generates a disk-synchronous sinusoidal output signal 753, for example $\cos(t*2*\pi/T)$, at a desired harmonic of disk rotational frequency. Sinusoidal output signal 753 is multiplied by a cosine amplitude coefficient $G_{COS}$ provided by SIN/COS coefficient adapter 730. Similarly, SIN generator 752 generates a disk-synchronous sinusoidal output signal 754, for example $\sin(t*2*\pi/T)$, at the desired harmonic of disk rotational frequency. Sinusoidal output signal 754 is multiplied by a sine amplitude coefficient $G_{SIN}$ provided by SIN/COS coefficient adapter 730. Cosine amplitude coefficient $G_{COS}$ and sine amplitude coefficient $G_{SIN}$ are selected by SIN/COS coefficient adapter 730 such that RRO compensation signal 703 forces actuator 760 to follow the desired harmonic with high accuracy. Actuator 760 represents actuator arm assembly 120 and voice coil motor 128 of HDD 100 in FIG. 1. As such, actuator 760 is configured to receive a modified input signal 704 to move read/write head 127 from a current radial location to a target radial position p.

It is noted that control system 700 includes a control system 799 that may be employed in a conventional HDD. As shown, control system 799 may include elements equivalent to target position generator 710, controller 720, SIN/COS coefficient adapter 730, COS generator 751, SIN generator 752, actuator 760, and summers and multipliers associated therewith. Thus, in typical operation, control system 700 employs control system 799, i.e., SIN/COS coefficient adapter 730, COS generator 751, SIN generator 752, and actuator 760, to servo read/write head 127 over a particular data storage track 320. Cosine amplitude coefficient $G_{COS}$ and sine amplitude coefficient $G_{SIN}$ modify actuator input signal 702 so that RRO associated with the particular data storage track 320 is reduced or eliminated.

According to embodiments, control system 700 includes additional functionality over control system 799. Specifically, RRO ILC coefficient adapter 740 is configured to generate amplitude coefficients for modifying disk-synchronous sinusoidal output signal 753 and disk-synchronous sinusoidal output signal 754 when control system 700 causes read/write head 127 to follow a target path that results in read/write head 127 moving continuously from a first radial position to a second radial position. That is, the amplitude coefficients generated by RRO ILC coefficient adapter 740 are employed when read/write head 127 is controlled to follow a target path that crosses multiple data storage tracks 320, such as when a reference spiral is being written by another read/write head 127 of HDD 100. Thus, during a seek of read/write head 127 in which the radial position of read/write head 127 follows a specific target path throughout the seek, RRO ILC coefficient adapter 740 modifies the amplitude of RRO compensation signal 703 by adding amplitude coefficient factors $F_{COS}$ and $F_{SIN}$ to the outputs of SIN/COS coefficient adapter 730. Alternatively, RRO ILC coefficient adapter 740 modifies the amplitude of RRO compensation signal 703 by replacing the outputs of SIN/COS coefficient adapter 730 with amplitude coefficient factors $F_{COS}$ and $F_{SIN}$.

In some embodiments, to generate accurate values for amplitude coefficient factors $F_{COS}$ and $F_{SIN}$ for a particular seek operation, such as the writing of a particular reference spiral 401, the particular seek operation is performed over multiple iterations. In such embodiments, during each iteration of the seek operation, block RRO COS ILC 741 computes amplitude coefficient $F_{COS}$, based on the actuator position signal 705, and block RRO SIN ILC 742 computes amplitude coefficient $F_{SIN}$, based on actuator position signal 705. Because amplitude coefficients $F_{COS}$ and $F_{SIN}$ are feed-forward coefficients, the newly computed values for amplitude coefficients $F_{COS}$ and $F_{SIN}$ are employed in the next iteration in which the particular seek operation is performed. The ILC algorithm employed in block RRO COS ILC 741 and block RRO SIN ILC 742 to compute amplitude coefficients $F_{COS}$ and $F_{SIN}$ may be any suitable adaptive algorithm known in the art.

In some embodiments, block RRO COS ILC 741 and block RRO SIN ILC 742 employ the following exemplary equations to compute new values for amplitude coefficients $F_{COS}$ and $F_{SIN}$ for each iteration of the seek operation performed:

$$F_{cos}(p,k+1)=F_{cos}(p,k)+K*G_{cos}(p+p_o,k)$$

$$F_{sin}(p,k+1)=F_{sin}(p,k)+K*G_{sin}(p+p_o,k)$$

In the above equations, k denotes iteration number; p denotes actuator position; $F_{cos}(p, k+1)$ denotes the table entry to generate $F_{cos}(p)$ at position p during iteration k+1; $F_{cos}(p, k)$ denotes the table entry to generate $F_{cos}(p)$ at position p during iteration k; $F_{sin}(p, k+1)$ denotes the table entry to generate $F_{sin}(p)$ at position p during iteration k+1; $F_{sin}(p, k)$ denotes the table entry to generate $F_{sin}(p)$ at position p during iteration k; $G_{cos}(p+p_o, k)$ denotes the value of $G_{cos}$ at actuator position $p+p_o$ during iteration k; $G_{sin}(p+p_o, k)$ denotes the value of $G_{sin}$ at actuator position $p+p_o$ during iteration k; K denotes a suitable adaptation gain (this is typically a tunable adaptation parameter); and $p_o$ denotes a suitable position offset (this is typically a tunable adaptation parameter).

With each iteration of the seek operation, the values of cosine amplitude coefficient $G_{COS}$ and sine amplitude coefficient $G_{SIN}$ are collected. A suitable adaptation algorithm is then employed in block RRO COS ILC 741 and block RRO SIN ILC 742 that adjusts the values of amplitude coefficients $F_{COS}$ and $F_{SIN}$ such that the variation of cosine amplitude coefficient $G_{COS}$ and sine amplitude coefficient $G_{SIN}$ are each minimized during subsequent iterations of the seek operation. Thus, amplitude coefficients $F_{COS}$ and $F_{SIN}$ approach values at which little or no PES is measured at the desired harmonic of disk rotational frequency for which these amplitudes are selected. Consequently, during a later iteration of the seek operation, the path followed by read/write head 127 falls within a maximum acceptable offset. For example, after a number of iterations of the seek operation, a path followed by read/write head 127 while being controlled to follow target path 502 in FIG. 5 falls within maximum acceptable offset 503. At such time, the iterative process is considered to have converged, and values of amplitude coefficients $F_{COS}$ and $F_{SIN}$ are frozen, and are no longer modified. In embodiments in which target path 502 represents an ideal path for reference spiral 401 on recording surface 221, read/write head 221A can now accurately write reference spiral 401 using the frozen values of amplitude coefficients $F_{COS}$ and $F_{SIN}$ while performing the appropriate seek operation.

Generally, with each iteration of the seek operation, PES 701 is reduced and, consequently, the values of disk-synchronous sinusoidal output signal 753 and disk-synchronous sinusoidal output signal 754 are also reduced or approach zero. Thus, in some embodiments, when the particular seek operation is performed using the frozen values of amplitude coefficients $F_{COS}$ and $F_{SIN}$, outputs from SIN/COS coefficient adapter 730 may be disabled.

In some embodiments, amplitude coefficient $F_{COS}$ and amplitude coefficient $F_{SIN}$ are stored in firmware tables, such as coefficient table 743, for various radial locations. A suitable table lookup algorithm finds the table entry belonging to the current radial actuator position and computes amplitude coefficient $F_{COS}$ and amplitude coefficient $F_{SIN}$ accordingly. Thus, in such embodiments, the values in coefficient table 743 are iteratively adapted as the multiple seek operations across the stroke are performed. During each adaptation seek operation the values of $G_{cos}$ and $G_{sin}$ are collected, and a suitable adaptation algorithm adjusts the RRO ILC tables such that the variation of $G_{cos}$ and $G_{sin}$ are minimized during seeks.

Entries for any suitable number of radial positions may be included in coefficient table 743. For example, coefficient table 743 may include a value for amplitude coefficient $F_{COS}$ and amplitude coefficient $F_{SIN}$ for as few as 10 radial positions or as many as 1000 or more radial locations. Generally, the computational and storage costs associated with storing a value for amplitude coefficient $F_{COS}$ and amplitude coefficient $F_{SIN}$ for each data storage track 320 outweighs the benefits in more accurately implemented radial seeks. For radial locations for which there is no table entry, interpolation or any other estimating technique may be applied to determine values for amplitude coefficient $F_{COS}$ and amplitude coefficient $F_{SIN}$.

It is noted that control system 700 is configured to generate accurate values for amplitude coefficient $F_{COS}$ and amplitude coefficient $F_{SIN}$, so that read/write head 127 can be moved accurately in a seek operation that closely follows a particular target path in the presence of significant RRO. However, control system 700, as shown, is configured to compensate for a RRO associated with a single harmonic of HDD 100, such as the first harmonic of the rotation speed of storage disks 110. To compensate for RRO introduced by additional harmonics of HDD 100, control system 700 may be supplemented with an additional RRO compensation system—one for each additional harmonic to be addressed. Each such additional RRO compensation system may include, without limitation, a SIN/COS coefficient adapter, RRO ILC Coefficient, COS generator, and SIN generator, all configured for the harmonic being addressed.

Figure 8:
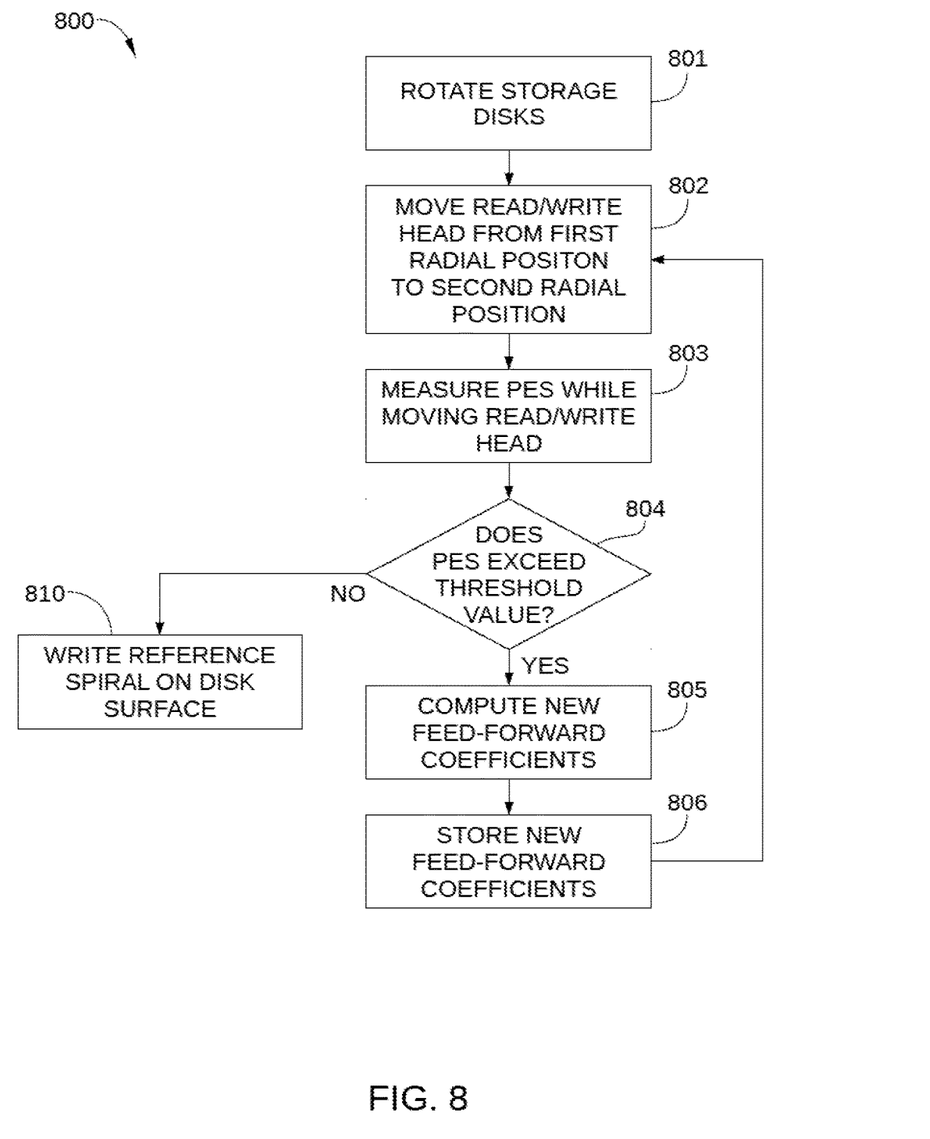
FIG. 8 sets forth a flowchart of method steps for controlling a read head in a magnetic storage device, according to an embodiment.

FIG. 8 sets forth a flowchart of method steps for controlling a read head in a magnetic storage device, according to an embodiment. Although the method steps are described in conjunction with HDD 100 in FIGS. 1, 2, and 7, persons skilled in the art will understand that the method steps may be performed with other types of systems. The control algorithms for the method steps may reside in microprocessor-based controller 133, or, in some embodiments, an external host device that is temporarily coupled to HDD 100 and used to facilitate the calibration of HDD 100. For clarity of description, microprocessor-based controller 133 is assumed to perform said control algorithms for the method steps, although other external control devices can potentially be used in such a role.

As shown, method 800 begins at step 801, when microprocessor-based controller 133 rotates storage disks 110, including a disk with servo wedges 300 formed thereon and a disk with a recording surface that does not have servo wedges formed thereon.

In step 802, microprocessor-based controller 133 moves a read/write head 127 from a first radial location, such as the ID storage disks 110, to a second radial location, such as the OD of storage disks 110. Thus, a seek operation is performed across some or all of the stroke of actuator arm assembly 120. In step 802, read/write head 127 is moved continuously across the disk with servo wedges 300 formed thereon, and therefore positions read/write head 127 based on timing and position information provided by servo wedges 300. In addition, the positioning of read/write head 127 is based on a feed-forward correction signal, such as RRO compensation signal 703. The values of feed-forward coefficients for the feed-forward correction signal are fetched from coefficient table 743. While moving from the first radial location to the second radial location, read/write head 127 generates a PES based on the servo wedges 300 formed on the disk surface.

In step 803, microprocessor-based controller 133 measures the PES generated in step 802. Generally, microprocessor-based controller 133 measures PES at multiple radial locations as read/write head 127 is moved continuously across the disk surface on which servo wedges 300 are formed. The number of radial locations may be on the order of 10, 100, 1000, or more, but generally does not correspond with the number of data storage tracks 300 formed on the disk surface.

In step 804, microprocessor-based controller 133 determines whether the PES measured at one or more of the multiple radial locations between the first radial location and the second radial location exceeds a predetermined threshold value. For example, the PES measured at a radial location may be equal to or greater than a value indicating that the location of read/write head 127 falls outside maximum acceptable offset 503. In such a case, method 800 proceeds to step 805. If no PES measured during step 803 exceeds the predetermined threshold value, method 800 proceeds to step 810.

In step 805, microprocessor-based controller 133 or SIN/COS coefficient adapter 740 computes new feed-forward coefficients for the feed-forward correction signal employed in step 801 to help position read/write head 127. For example, when the feed-forward correction signal employed in step 801 is RRO compensation signal 703, RRO SIN/COS ILC adapter 740 computes new values for amplitude coefficient factors $F_{COS}$ and $F_{SIN}$.

In step 806, microprocessor-based controller 133 or RRO SIN/COS ILC coefficient adapter 740 stores the new feed-forward coefficients computed in step 805. For example, in some embodiments, the previous values stored in coefficient table 743 for amplitude coefficient factors $F_{COS}$ and $F_{SIN}$ are replaced with the updated values computed in step 805. Thus, for a subsequent iteration of the seek operation performed in step 802, read/write head 127 is positioned more accurately along the target path for the seek operation. Upon completion of step 806, method 800 returns to step 802 for another iteration of the seek operation.

In step 810, which is performed responsive to microprocessor-based controller 133 determining that no PES measured during step 803 exceeds the predetermined threshold value, microprocessor-based controller 133 causes a reference spiral to be written on a different surface than the surface with servo wedges 300. Specifically, read/write head 127 is moved continuously across the disk surface on which servo wedges 300 are formed while positioning read/write head 127 based on the servo wedges and an updated feed-forward correction signal. The updated feed-forward correction signal, such as RRO compensation signal 703, is based on the most recently updated feed-forward coefficients computed by RRO SIN/COS ILC coefficient adapter 740. Further, while read/write head 127 moves continuously across the disk, microprocessor-based controller 133 causes another read/write head 127 to write a reference spiral on a different surface than the surface with servo wedges 300.

Thus, by performing multiple iterations of a particular seek operation, feed-forward coefficients for the seek operation can be computed by an ILC, so that the seek operation can be precisely controlled, for example while writing a reference spiral.

In sum, embodiments described herein provide systems and methods for accurately compensating for repeatable runout (RRO) while moving a magnetic head across a disk surface. An iterative learning control algorithm is employed to determine appropriate feed-forward coefficients for an RRO compensation signal for each of a plurality of radial locations across the disk surface. The feed-forward coefficients are determined by performing multiple iterations of continuously moving the magnetic head across the disk surface along a target path while measuring a position error signal that indicates the radial error between the magnetic head and the target path. With each iteration, the iterative learning control algorithm computes new feed-forward coefficients for each of the plurality of radial locations, the new feed-forward coefficients being selected to reduce the measured position error signal when employed to move the magnetic head along the target path.

While the foregoing is directed to embodiments of the present invention, other and further embodiments of the invention may be devised without departing from the basic scope thereof, and the scope thereof is determined by the claims that follow.

We claim:

1. A method of controlling a read head in a magnetic storage device, the method comprising:
   rotating the disk having a surface with servo wedges;
   moving the read head continuously across the disk in a radial direction from a first radial location to a second radial location while positioning the read head based on the servo wedges and a feed-forward correction signal and generating a position error signal (PES); and
   measuring the generated PES at multiple radial locations of the disk as the read head is moved continuously in the radial direction, wherein each measured PES is input to an adaptive learning algorithm that corrects feed-forward coefficients for the feed-forward correction signal,
   wherein the first radial location is one of an inner diameter of the disk or an outer diameter of the disk and the second radial location is the other of the inner diameter of the disk or the outer diameter of the disk.

2. The method of claim 1, further comprising:
   determining that the measured PES at one of the multiple radial locations between the first radial location and the second radial location exceeds a predetermined threshold value; and
   responsive to the determining, for each of the multiple radial locations, computing feed-forward coefficients for the feed-forward correction signal via the adaptive learning algorithm, and storing the feed-forward coefficients.

3. The method of claim 2, further comprising:
   moving the read head continuously across the disk in the radial direction from the first radial location toward a particular radial location of the multiple radial locations;
   generating a compensation signal based on the stored feed-forward coefficients for the particular radial location;
   adding the compensation signal to an actuator input signal to generate a modified actuator signal that, when applied to an actuator configured to radially position the read head, positions the read head at the particular radial location; and
   applying the modified actuator signal to the actuator.

4. The method of claim 3, further comprising:
   after applying the modified actuator signal to the actuator, measuring a PES at the particular radial location; and
   inputting the PES measured at the particular radial location into the adaptive learning algorithm.

5. The method of claim 4, further comprising:
   based on the PES input into the adaptive learning algorithm, generating corrected feed-forward coefficients for the particular radial location; and
   replacing the stored feed-forward coefficients for the particular radial location with the corrected feed-forward coefficient for the particular radial location.

6. The method of claim 1, wherein moving the read head continuously across the disk in the radial direction from the first radial location to the second radial location comprises moving the read head along a target path between the first radial location and the second radial location.

7. The method of claim 6, wherein the target path crosses multiple data tracks on the surface.

8. The method of claim 6, wherein the target path corresponds to an ideally formed reference spiral.

9. The method of claim 1, further comprising:
   based on the PES measured at the multiple radial locations, updating feed-forward coefficients for each of the multiple radial locations;
   moving the read head continuously across the disk in the radial direction from the first radial location to the second radial location while positioning the read head based on the servo wedges and an updated feed-forward correction signal that is based on the updated feed-forward coefficients; and
   while moving the read head continuously across the disk in the radial direction from the first radial location to the second radial location while positioning the read head based on the servo wedges and the updated feed-forward correction signal, writing a reference spiral on a different surface than the surface with the servo wedges.

10. The method of claim 1, wherein moving the read head continuously across the disk in the radial direction from the first radial location to the second radial location comprises moving the read head without stopping at any one radial location.

11. The method of claim 1, wherein moving the read head continuously across the disk in the radial direction from the first radial location to the second radial location while positioning the read head based on the servo wedges comprises moving the read head at a constant radial velocity.

12. The method of claim 11, wherein moving the read head continuously across the disk in the radial direction from the first radial location to the second radial location while positioning the read head based on the feed-forward correction signal comprises increasing or decreasing the constant radial velocity.

13. The method of claim 1, wherein the feed-forward coefficients are selected to reduce PES that is measured at the multiple radial locations with respect to a first harmonic of the rotating disk.

14. The method of claim 13, wherein each measured PES is input to a second adaptive learning algorithm that corrects second feed-forward coefficients for a second feed-forward correction signal that is configured to reduce PES that is measured at the multiple radial locations with respect to a second harmonic of the rotating disk.

15. A data storage device comprising:
a first data storage disk having a first recording surface with servo wedges;
a second data storage disk having a second recording surface;
first and second read/write heads configured to move in unison in a radial direction relative to the first and second recording surfaces, respectively; and
a controller configured to:
rotate the first and second data storage disks,
move the read head continuously across the first data storage disk in the radial direction from a first radial location to a second radial location while positioning the read head based on the servo wedges and a feed-forward correction signal and generating a position error signal (PES), wherein the first radial location is one of an inner diameter of the disk or an outer diameter of the disk and the second radial location is the other of the inner diameter of the disk or the outer diameter of the disk, and
measure the generated PES at multiple radial locations of the first data storage disk as the read head is moved continuously in the radial direction, wherein each measured PES is input to an adaptive learning algorithm that corrects feed-forward coefficients for the feed-forward correction signal.

16. The data storage device of claim 15, wherein the controller is further configured to move the read head continuously across the first disk from the first radial location to the second radial location by moving the read head along a target path between the first radial location and the second radial location.

17. The data storage device of claim 16, wherein the target path crosses multiple data tracks on the first recording surface.

18. The data storage device of claim 15, wherein the controller is further configured to, based on the PES measured at the multiple radial locations, update feed-forward coefficients for each of the multiple radial locations.

19. The data storage device of claim 18, wherein the controller is further configured to:
move the read head continuously across the first storage disk in the radial direction from the first radial location to the second radial location while positioning the read head based on the servo wedges and an updated feed-forward correction signal that is based on the updated feed-forward coefficients; and
while moving the read head continuously across the first data storage disk in the radial direction from the first radial location to the second radial location while positioning the read head based on the servo wedges and the updated feed-forward correction signal, write a reference spiral on the second recording surface.

20. A data storage device comprising:
a first data storage disk having a first recording surface with servo wedges;
a second data storage disk having a second recording surface;
first and second read/write heads configured to move in unison in a radial direction relative to the first and second recording surfaces, respectively; and
a controller configured to:
rotate the first and second data storage disks,
move the read head continuously across the first data storage disk in the radial direction along a target path that crosses multiple data tracks on the first recording surface from a first radial location to a second radial location while positioning the read head based on the servo wedges and a feed-forward correction signal and generating a position error signal (PES), and
measure the generated PES at multiple radial locations of the first data storage disk as the read head is moved continuously in the radial direction along the target path, wherein each measured PES is input to an adaptive learning algorithm that corrects feed-forward coefficients for the feed-forward correction signal.

* * * * *